(12) United States Patent
Lüthi et al.

(10) Patent No.: US 11,067,690 B2
(45) Date of Patent: Jul. 20, 2021

(54) MEASURING APPARATUS COMPRISING AN INTERFEROMETER AND AN ABSORPTION MEDIUM DEFINING A DENSE LINE SPECTRUM

(71) Applicant: LEICA GEOSYSTEMS AG, Heerbrugg (CH)

(72) Inventors: Thomas Lüthi, Aarau (CH); Burkhard Böckem, Rieden (CH); Yves Salvadé, St. Imier (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 16/408,307

(22) Filed: May 9, 2019

(65) Prior Publication Data
US 2019/0265355 A1    Aug. 29, 2019

Related U.S. Application Data

(63) Continuation of application No. 14/399,498, filed as application No. PCT/EP2013/059375 on May 6, 2013, now Pat. No. 10,338,219.

(30) Foreign Application Priority Data

May 7, 2012    (EP) ..................... 12166955

(51) Int. Cl.
*G01S 17/08*    (2006.01)
*G01S 17/10*    (2020.01)
(Continued)

(52) U.S. Cl.
CPC ............... *G01S 17/08* (2013.01); *G01B 9/02* (2013.01); *G01B 9/02002* (2013.01);
(Continued)

(58) Field of Classification Search
CPC .......... G01S 17/08; G01S 17/10; G01S 17/36; G01S 7/497; G01S 17/66; G01S 7/4814;
(Continued)

(56) References Cited

U.S. PATENT DOCUMENTS

| 3,970,389 A | 7/1976 | Mendrin et al. |
| 4,340,306 A * | 7/1982 | Balasubramanian ....................... G01B 11/303 356/513 |

(Continued)

FOREIGN PATENT DOCUMENTS

| CN | 101868688 A | 10/2010 |
| DE | 102 02 759 A1 | 2/2003 |

(Continued)

OTHER PUBLICATIONS https://www.physics.umd.edu/courses/Phys375/Anlage_Fall09/Lab4MichelsonRevF09.pdf Retrieved Apr. 9, 2018.
(Continued)

*Primary Examiner* — Mohamed K Amara
(74) *Attorney, Agent, or Firm* — Maschoff Brennan

(57) ABSTRACT

A measuring apparatus comprising a tunable laser diode for generating a mono mode measurement radiation, said laser diode being designed as a laser beam source in such a way that an emission wavelength of the measurement radiation is variable within a wavelength range by means of the variation of a tuning parameter, comprising an absorption medium defining absorption lines within the wavelength range, comprising a memory having a line atlas for the absorption medium, comprising a detector for determining an absorptivity and comprising a control and evaluation unit for regulating the emission wavelength by means of the at
(Continued)

least one tuning parameter in a manner dependent on the absorptivity determined in such a way that the emission wavelength remains stable.

12 Claims, 6 Drawing Sheets

(51) Int. Cl.
    *G01S 17/36*     (2006.01)
    *G01B 9/02*     (2006.01)
    *G01S 7/497*     (2006.01)
    *G01B 11/14*     (2006.01)

(52) U.S. Cl.
    CPC .............. *G01B 11/14* (2013.01); *G01S 7/497* (2013.01); *G01S 17/10* (2013.01); *G01S 17/36* (2013.01)

(58) Field of Classification Search
    CPC ...... G01S 7/4911; G01S 7/4917; G01S 17/42; G01S 17/936; G01S 17/88; G01B 9/02; G01B 11/14; G01B 9/02002; G01B 11/026; G01B 11/00; G01B 11/24; G01B 11/26; G01B 11/02; G01B 11/272; G01B 11/2441; G01B 9/02004; G01B 11/002
    See application file for complete search history.

(56) References Cited

U.S. PATENT DOCUMENTS

| | | | |
|---|---|---|---|
| 4,733,609 A | 3/1988 | Goodwin et al. | |
| 5,106,191 A | 4/1992 | Ohtsuka | |
| 5,123,742 A | 6/1992 | Takizawa et al. | |
| 5,309,277 A | 5/1994 | Deck | |
| 5,321,501 A | 6/1994 | Swanson et al. | |
| 5,371,587 A * | 12/1994 | de Groot | G01B 9/02004 356/486 |
| 5,398,113 A * | 3/1995 | de Groot | G01B 11/2441 356/497 |
| 5,471,303 A * | 11/1995 | Ai | G01B 11/2441 356/497 |
| 5,541,730 A * | 7/1996 | Chaney | G01B 9/02004 356/482 |
| 5,543,914 A * | 8/1996 | Henshaw | G01B 9/02007 356/487 |
| 5,784,161 A * | 7/1998 | Bechstein | G01J 9/04 356/487 |
| 5,811,826 A * | 9/1998 | Shirley | G01B 11/26 250/559.29 |
| 5,956,141 A * | 9/1999 | Hayashi | G01B 11/2441 356/496 |
| 5,991,034 A * | 11/1999 | Ohtsuka | G01B 11/2441 356/489 |
| 6,094,274 A | 7/2000 | Yokoi | |
| 6,134,003 A | 10/2000 | Tearney et al. | |
| 6,160,826 A * | 12/2000 | Swanson | A61B 1/00183 372/102 |
| 6,208,424 B1 * | 3/2001 | de Groot | G01B 9/02007 356/486 |
| 6,282,011 B1 | 8/2001 | Tearney et al. | |
| 6,327,039 B1 * | 12/2001 | de Groot | G01B 9/02083 356/517 |
| 6,359,692 B1 * | 3/2002 | Groot | G01B 11/2441 356/512 |
| 6,449,048 B1 * | 9/2002 | Olszak | G01B 11/2441 356/497 |
| 6,485,413 B1 * | 11/2002 | Boppart | A61B 1/00096 356/450 |
| 6,501,551 B1 | 12/2002 | Tearney et al. | |
| 6,525,825 B2 * | 2/2003 | de Groot | G01B 9/02007 356/484 |
| 6,570,894 B2 | 5/2003 | Anderson | |
| 6,619,864 B2 | 9/2003 | Johnson et al. | |
| 6,724,486 B1 * | 4/2004 | Shull | G02F 1/37 356/486 |
| 6,922,418 B2 | 7/2005 | Funakawa | |
| 6,959,153 B2 | 10/2005 | Vohra | |
| 6,993,257 B2 | 1/2006 | Althouse et al. | |
| 7,420,689 B2 * | 9/2008 | Bodermann | G01N 21/45 356/486 |
| 7,733,497 B2 | 6/2010 | Yun et al. | |
| 7,889,348 B2 | 2/2011 | Tearney et al. | |
| 7,898,669 B2 * | 3/2011 | Kim | G01B 9/02004 356/486 |
| 7,916,387 B2 * | 3/2011 | Schmitt | A61B 5/0073 359/344 |
| 7,978,338 B2 | 7/2011 | De Groot et al. | |
| 8,013,303 B2 | 9/2011 | Ershov et al. | |
| 8,031,331 B2 | 10/2011 | Meier et al. | |
| 8,125,648 B2 * | 2/2012 | Milner | A61B 5/0075 356/497 |
| 8,339,611 B2 * | 12/2012 | Kuramoto | G01B 9/02003 356/486 |
| 8,477,316 B2 | 7/2013 | Holzapfel | |
| 8,502,986 B2 | 8/2013 | Koda et al. | |
| 8,576,404 B2 | 11/2013 | Kuramoto et al. | |
| 8,654,342 B2 | 2/2014 | Jensen et al. | |
| 8,797,542 B2 * | 8/2014 | Tokimitsu | G01B 9/02027 356/486 |
| 8,896,843 B2 * | 11/2014 | Rohner | G01B 9/02 356/498 |
| 9,091,573 B2 | 7/2015 | Van Der Lee et al. | |
| 9,151,941 B2 * | 10/2015 | Fresquet | G01B 9/0209 |
| 9,377,290 B2 | 6/2016 | Yun et al. | |
| 9,638,686 B1 | 5/2017 | Cafferty et al. | |
| 9,795,301 B2 | 10/2017 | Fleming et al. | |
| 9,835,441 B2 | 12/2017 | Chen et al. | |
| 2001/0036002 A1 * | 11/2001 | Tearney | A61B 1/00183 359/287 |
| 2002/0131053 A1 * | 9/2002 | Groot | G01B 9/02027 356/517 |
| 2002/0135775 A1 * | 9/2002 | De Groot | G01B 11/30 356/497 |
| 2002/0158211 A1 | 10/2002 | Gillispie | |
| 2002/0176091 A1 * | 11/2002 | Deck | G01B 11/0608 356/512 |
| 2002/0196450 A1 * | 12/2002 | Olszak | G01B 9/0209 356/511 |
| 2003/0011784 A1 * | 1/2003 | De Groot | G01B 9/02072 356/512 |
| 2003/0020895 A1 * | 1/2003 | Bridges | G01S 7/4812 356/4.01 |
| 2003/0112444 A1 * | 6/2003 | Yang | G01B 9/02078 356/486 |
| 2003/0137669 A1 * | 7/2003 | Rollins | G01N 21/4795 356/479 |
| 2005/0035295 A1 * | 2/2005 | Bouma | G01B 9/02091 250/341.1 |
| 2005/0036150 A1 * | 2/2005 | Izatt | G01B 9/02014 356/479 |
| 2005/0057756 A1 * | 3/2005 | Fang-Yen | G01B 9/0209 356/497 |
| 2006/0061773 A1 * | 3/2006 | Lee | G01B 11/2441 356/511 |
| 2006/0158658 A1 * | 7/2006 | Colonna De Lega | G01B 9/02088 356/497 |
| 2006/0244973 A1 | 11/2006 | Yun et al. | |
| 2007/0030542 A1 * | 2/2007 | Grasso | G03H 1/0005 359/9 |
| 2007/0171425 A1 * | 7/2007 | De Groot | G01B 9/02027 356/478 |
| 2007/0206201 A1 * | 9/2007 | de Groot | G01B 9/02007 356/512 |
| 2008/0018901 A1 * | 1/2008 | Groot | G01B 9/0201 356/450 |
| 2008/0174784 A1 | 7/2008 | Colonna De Lega et al. | |
| 2008/0252901 A1 * | 10/2008 | Shimizu | G01N 21/4795 356/497 |

(56) References Cited

U.S. PATENT DOCUMENTS

| | | |
|---|---|---|
| 2009/0200472 A1 | 8/2009 | Gregory |
| 2009/0219606 A1* | 9/2009 | Lawrence ............... G02F 1/293 |
| | | 359/299 |
| 2011/0122906 A1 | 5/2011 | Seeley et al. |
| 2011/0211198 A1 | 9/2011 | Koda et al. |
| 2011/0295484 A1 | 12/2011 | L'Henoret |
| 2012/0176625 A1* | 7/2012 | Huntley ............. G01B 11/2441 |
| | | 356/511 |
| 2013/0114855 A1 | 5/2013 | Kane et al. |
| 2014/0270342 A1 | 9/2014 | Kane et al. |
| 2015/0138528 A1 | 5/2015 | Lüthi et al. |
| 2015/0288893 A1 | 10/2015 | Kane et al. |
| 2015/0355327 A1 | 12/2015 | Goodwin et al. |

FOREIGN PATENT DOCUMENTS

| | | |
|---|---|---|
| EP | 0 553 266 B1 | 6/1997 |
| EP | 0 933 845 A2 | 8/1999 |
| EP | 2 128 561 A1 | 12/2009 |
| EP | 2 589 982 A1 | 5/2013 |
| JP | H1-1220198 A | 8/1998 |
| JP | 2011-0179934 A | 9/2011 |
| JP | 2012-042326 A | 3/2012 |
| WO | 2007079600 A1 | 7/2007 |

OTHER PUBLICATIONS http://qphotonics.coms/Wavelength-Stabilized-Laser-Diodes/ (2000).
European Search Report dated Nov. 6, 2012 as received in Application No. EP 12 16 6955.

* cited by examiner

MEASURING APPARATUS COMPRISING AN INTERFEROMETER AND AN ABSORPTION MEDIUM DEFINING A DENSE LINE SPECTRUM

FILED OF THE INVENTION

The invention relates to a measuring apparatus comprising an interferometer and a calibration method for and with an interferometer.

BACKGROUND

For measurements in the field of optical metrology, wavelength-stabilized gas lasers (HeNe lasers) are often used as a light source. These substantially have high wavelength stability (depending on the stabilization process) and a long coherence length of several hundred meters. As a result, these beam sources are particularly suitable for use as frequency and wavelength standards and enable great measurement ranges for interferometric measurement systems. Typical applications comprise e.g. linear interferometers, wavelength standards, vibrometers and the use as an interferometer light source in a laser tracker.

However, a disadvantage of the use of gas laser sources (HeNe laser light sources), in particular of laser trackers, in view of generally sought after miniaturization is the size thereof, which determines the radiant flux. The power of the light source in this case depends significantly on the length of the laser tube, i.e. the achievable emission power increases with increasing length of tube. Moreover, such a laser source usually exhibits a relatively high power dissipation. A further disadvantage is constituted by the high-voltage supply required for operation. By way of example, a voltage of approximately 7000 V must be provided for igniting the laser and a voltage of approximately 1500 V must be provided during operation, as a result of which special components (e.g. high-voltage power supply and shielding) have to be used and safety measures have to be taken when using such light sources. The sensitivity in relation to magnetic fields (e.g. generated by internal motors or external welding transformers) and the restricted life of the tubes (typically approximately 15,000 operating hours) are also disadvantageous when using HeNe lasers—for example because the light sources in the systems often need to be replaced at great cost.

In this context, e.g. laser diodes are alternative light sources. These are, per se, compact, cost-effective and have a low power consumption. However, conventional Fabry-Pérot laser diodes are not suitable as interferometer light sources since these have comparatively short coherence length and do not emit in (longitudinal) single mode fashion (i.e. they emit with a plurality of wavelengths).

However, for example, the following can be used as beam sources:
  distributed feedback lasers (DFBs) (with a periodically structured active medium, e.g. grating),
  distributed Bragg reflector lasers (DBRs) (with an optical grating outside of the active medium but disposed on a common chip),
  fiber Bragg grating lasers (FBGs) (substantially like a DFB laser, but with a grating in an external fiber),
  external cavity diode lasers (ECDLs) (stabilization of the laser diode by means of an external highly stable cavity, e.g. with a holographic grating),
  diode pumped solid state lasers (DPSSs),
  discrete mode lasers (DMDs) and/or
  microchip lasers.

Here, the beam sources are embodied in such a way that the emitted laser beam is in single mode fashion in respect of the wavelength, with a coherence length of the order of several 10 m (or a line width <1 MHz).

A stabilization to a known wavelength is additionally required for the use of such laser diodes as an interferometer light source or as a wavelength standard. By way of example, this can be brought about spectroscopically to an absorption line of an absorption medium (e.g. by using a gas cell). Here, very many absorption lines may occur in a desired wavelength range, depending on the employed absorption medium. On the one hand, so many absorption lines are then available that an absorption line for stabilization purposes can always be achieved, even in the case of manufacturing-caused scattering of the emission wavelength of the laser diode; on the other hand, this line also needs to be unambiguously identified every time the light source is started up in order to determine the emission wavelength.

To this end, it is possible, in principle, simply to stabilize to any line and identify the latter during production using an external wavelength measuring apparatus. If the diode parameters, such as e.g. temperature and current, set for this are stored and re-established during the next switch-on, it should once again be possible to land at the original line in the case of perfect actuation electronics and retrieve this using a short wavelength scan. A possible change in the setting parameters of the diode as a result of aging can be trapped by storing the respective last values. However, the method places high demands on the quality of the actuation electronics and is very susceptible in the case of possible small wavelength distances between the absorption lines.

The requirements on the measuring apparatus can analogously be transferred to measurement devices which comprise an interferometer unit for determining changes in the distance. Here, measurement devices which are embodied for continuous tracking of a target point and determining the position of this point coordinatively may generally be subsumed by the term laser tracker. A target point can in this case be represented by a retroreflector unit (e.g. a cube prism) which is targeted by an optical measurement beam of the measurement device, in particular by a laser beam. The laser beam is reflected back to the measurement device in parallel, with the reflected beam being acquired by an acquisition unit of the device. In the process, an emission or reception direction of the beam is established, for example by means of sensors for an angle measurement, which are assigned to a deflection mirror or a targeting unit of the system. Moreover, a distance between the measuring apparatus and the target point is established, e.g. by means of time of flight or phase difference measurement, in addition to the acquisition of the beam.

Laser trackers according to the prior art can additionally be embodied with an optical image acquisition unit with a two dimensional, light-sensitive array, e.g. a CCD or CID camera (CCD=charge coupled device; CID=charge injection device) or a camera based on a CMOS array, or with a pixel array sensor and with an image processing unit. Here, the laser tracker and the camera are, in particular, assembled on one another in such a way that the positions thereof relative to one another cannot be modified. By way of example, the camera can be rotated together with the laser tracker about the substantially perpendicular axis thereof, but it can be pivoted up-and-down independently of the laser tracker and is therefore, in particular, disposed separately from the optical unit of the laser beam. In particular, the camera may comprise a fisheye optical unit and pivoting of the camera may be avoided or at least only required to restricted extent due to a very large image acquisition region of the camera. Furthermore, it is possible that the camera—e.g. depending on the respective application—is embodied to be pivotable about one axis only. In alternative embodiments, the camera can, in an integrated design, be installed together with the laser optical unit in a common housing.

By acquiring and evaluating an image—by means of the image acquisition and image processing unit—of a so-called auxiliary measuring instrument with markings, the relative positions of which with respect to one another are known, it is possible to deduce an orientation of the instrument and of an object disposed on the auxiliary measuring instrument (e.g. a probe) in space. Together with the determined spatial position of the target point, it is furthermore possible to precisely determine the position and orientation of the object in space, in absolute terms and/or relative to the laser tracker.

Such auxiliary measuring instruments can be embodied by so-called sensing tools, which are positioned with the contact point thereof on a point of the target object. The sensing tool has markings, e.g. light points, and a reflector, which represents a target point on the sensing tool and can be targeted by the laser beam of the tracker, wherein the positions of the markings and of the reflector relative to the contact point of the sensing tool are known precisely. The auxiliary measuring instrument can also be, in a manner known to a person skilled in the art, a, for example handheld, scanner equipped for distance measurement for contactless surface measurements, the direction and position of the scanner measurement beam used for the distance measurement relative to the light points and reflectors arranged on the scanner being known precisely. A scanner of this type is described in EP 0 553 266, for example.

Furthermore, in modern tracker systems—increasingly in a standardized manner—a sensor (PSD) is used to establish a deviation in the received measurement beam from a zero position. In this context, a PSD is intended to be understood to mean an area sensor that operates locally in the analog domain and that can be used to determine a focus for a light distribution on the sensor area. In this case, the output signal from the sensor is produced by means of one or more photosensitive areas and is dependent on the respective position of the light focus. Downstream or integrated electronics can be used to evaluate the output signal and to establish the focus. In this case, the position of the focus of the impinging light point can be ascertained very quickly (microsecond range) and with a nanometer resolution.

This PSD can be used to determine a deviation in the impingement point of the acquired beam from a servo control zero point, and the deviation can be taken as a basis for readjusting the laser beam to the target. For this purpose and in order to achieve a high level of precision, the field of view of this PSD is chosen to be comparatively small, i.e. to correspond to the beam diameter of the measurement laser beam. Acquisition using the PSD takes place coaxially with respect to the measurement axis, as a result of which the acquisition direction of the PSD corresponds to the measurement direction.

For distance measurement, laser trackers in the prior art have at least one distance measurement device, said distance measurement device possibly being in the form of an interferometer, for example. Since such distance rangefinders can measure only relative changes in the distance, what are known as absolute distance measurement devices are installed in today's laser trackers in addition to interferometers. By way of example, such a combination of measuring means for distance determination is known by means of the product AT901 from Leica Geosystems AG.

The interferometers used for the distance measurement in this connection can—on account of the large coherence length and the measurement range permitted thereby—comprise HeNe gas lasers or the abovementioned laser diodes as light sources, which laser diodes have stated advantages in terms of power consumption and space requirement. A combination of an absolute distance measurement device and an interferometer for determining distance with an HeNe laser is known from WO 2007/079600 A1, for example. Use of a laser diode as an interferometer laser light source is described, for example, in European patent application no. 11187614.0.

For the purposes of a reliable distance measurement or a measurement of the change in distance in the case of using a laser diode, which is to be sought-after in view of the aforementioned advantages, the wavelength of the employed measurement radiation must be stabilized and known precisely in the process. Here, as mentioned previously, high demands are placed on the quality of the actuation electronics, with the latter being very susceptible in the case of possibly small distances between the wavelengths of the absorption lines. Therefore, the re-set wavelength cannot be generated with absolute reliability, despite reproducing known actuation parameters and a stabilized wavelength generated thereby. Particularly if e.g. two or more absorption lines lie close together with a small line distance therebetween and the laser diode, when it is started up, is stabilized using one of these lines, but the current line used for stabilization cannot be determined with certainty, a precise determination of the emission wavelength is impossible.

SUMMARY

Some embodiments of the present invention provide an improved measuring apparatus, in particular a laser tracker, using an interferometer or a method, wherein the means for generating laser radiation for measuring the distance have, in the totality thereof, a compact design, and an apparatus-side determination or setting of an emission wavelength of emitted laser radiation can be carried out in a reliable and unique manner.

Some embodiments of the invention provide a measuring apparatus, in particular a laser tracker, with a means for stabilizing the emission wavelength and a tunable laser diode, wherein a current emission wavelength of the laser diode can be determined unambiguously.

Some embodiments of the present invention provide a measuring apparatus, in particular a laser tracker, wherein a unique identification of an absorption line used for stabilization can be carried out, in particular at each system startup.

Further, alternative aspects relating to determining a wavelength of a diode, provided for interferometry, in a laser tracker are described in the European patent application with the applicant file reference KAP-52634-EP, which has an identical filing date as the present application.

The invention relates to a measuring apparatus using an interferometer—more precisely: a rangefinder for determining a change in the distance to an object using an interferometer for generating an interferometer output variable for the respective distances to the object—comprising a tunable laser diode embodied as an interferometer laser beam source for generating measurement radiation in such a way that the measurement radiation is present in longitudinally monomode fashion and an emission wavelength of the measurement radiation is variable within a specific wavelength range by varying at least one tuning parameter. Here, the laser diode is embodied in such a way that the wavelength can be tuned in a mode hop-free fashion within the wavelength range. Moreover, provision is made for an absorption medium defining a multiplicity of known absorption lines within the wavelength range, a memory with a stored line atlas (spectral atlas) for the absorption medium, which line atlas in each case specifies an absorption strength for respective absorption wavelengths within the wavelength range, and a detector for determining the absorption strength. Furthermore, the rangefinder comprises a control and evaluation unit embodied in such a way that the emission wavelength is regulated in such a way by means of the at least one tuning parameter as a function of the determined absorption strength when a distance measuring mode is carried out that the emission wavelength remains stable.

The control and evaluation unit is furthermore embodied in such a way that there is an orientation in the line atlas (i.e. an identification of a region of the atlas) when carrying out a calibration mode by virtue of defined sample measurements being carried out controlled by the control and evaluation unit by varying at least one measurement parameter and sample measurement results being derived from the sample measurements. Moreover, there is a comparison of the sample measurement results with at least one reference, which is based on the stored line atlas and known for the defined sample measurements, wherein the sample measurement results are compared to at least the reference within the scope of the comparison. The orientation in the line atlas is furthermore established as a function of the comparison and on the basis of an algorithmic evaluation. The emission wavelength of the measurement radiation can be determined and/or set as a function of the established orientation in the line atlas, in particular wherein the calibration mode is carried out when putting the rangefinder into operation, controlled automatically by the control and evaluation unit, and the orientation in the line atlas determined in the process is stored for carrying out the measurement mode.

Therefore, by means of this calibration mode, it is possible to perform a unique assignment of a present, initially unknown wavelength of the measurement radiation in a line atlas by a comparison with at least one reference (e.g. line atlas) such that the wavelength can be determined and therefore becomes known.

Within the scope of the present invention, at least the following should be understood as a laser diode:
- distributed feedback lasers (DFBs) (with a periodically structured active medium, e.g. grating),
- distributed Bragg reflector lasers (DBRs) (with an optical grating outside of the active medium but disposed on a common chip),
- fiber Bragg grating lasers (FBGs) (substantially like a DFB laser, but with a grating in an external fiber),
- external cavity diode lasers (ECDLs) (stabilization of the laser diode by means of an external highly stable cavity, e.g. with a holographic grating),
- diode pumped solid state lasers (DPSSs),
- discrete mode lasers (DMDs),
- microchip lasers and/or
- diode lasers.

However, alternative laser diode embodiments are explicitly not precluded. The diodes can be embodied in such a way that the emitted laser beam is generated with a coherence length of the order of at least 10 m (or a line width <1 MHz). In this context, a wavelength-selective component, in particular an optical grating, can be provided for generating the measurement radiation.

In particular, using a special embodiment of the rangefinder, according to the invention and within the scope of the sample measurements, the emission wavelength can be varied as a measurement parameter and the absorption strength can be acquired continuously in the process by means of the detector. In particular, this is carried out by varying the at least one tuning parameter when carrying out the calibration mode in a manner controlled by the control and evaluation unit.

In this context, it is furthermore possible, according to the invention, for measurement parameter-dependent sample absorption lines to be determined as sample measurement results—in particular once again when carrying out the calibration mode by the control and evaluation unit—by continuously acquiring the absorption strength.

Within the scope of the invention, it is moreover possible to determine the orientation in the line atlas as a function of a correspondence between the measurement parameter-dependent sample absorption lines and the known absorption lines, in particular by means of a cross correlation of the measurement parameter-dependent sample absorption lines and the known absorption lines and/or by means of a least squares adjustment. This determination of the orientation occurs, in particular, when carrying out the calibration mode by the control and evaluation unit.

The used absorption line can therefore be identified by a short wavelength scan using the laser diode (which is tunable by a change in current and/or temperature) and a simultaneous recording of the absorption spectrum resulting in the process. By comparing the observed section of the absorption spectrum—wherein the wavelengths are still unknown in the process—with a known absorption spectrum (line atlas with absorption as a function of the wavelength) for the gas used in the absorption cell, it is possible to identify the observed lines by establishing an orientation in the line atlas (establishing a region in the atlas) and therefore said lines can be assigned to wavelengths. By way of example, this comparison can be brought about by cross correlation.

The condition for the method is that the wavelength of the diode is tunable in a mode hop-free manner over a sufficiently large tuning region (e.g. 0.1 nm), wherein the actually required wavelength range may also depend on how well a start wavelength is known, i.e. how well the last-set operating parameters of the laser diode can be reproduced.

Here, the diode start method can be configured in such a way that the operating parameters present during the last switch-off are initially reproduced, as a result of which the wavelength is known with a certain uncertainty. Subsequently, the short wavelength scan is carried out and the lines detected in the process are uniquely identified by means of a comparison, e.g. by cross correlation with the known reference spectrum, using the approximately known start wavelength. The stabilization to the selected absorption line can take place on this basis.

In particular, according to the invention, there can be a distance comparison of distances between the sample absorption lines with known distances between the absorption lines and the line atlas orientation can be determined taking into account the distance comparison and/or the absorption strength can be determined for each sample absorption line from the measurement parameter-dependent sample absorption lines and the orientation in the line atlas can be determined taking into account the determined absorption strength. These steps also in particular take place when the calibration mode is carried out by the control and evaluation unit.

Therefore, comparing the sample measurement results with the reference or with the line atlas in order to establish the orientation in the line atlas can be brought about by comparing the respective line distances or by comparing the respective absorption levels for the lines.

Another aspect according to the invention in respect of carrying out the calibration mode of the rangefinder relates to the varying of a distance to the object as a measurement parameter within the scope of the sample measurements. The sample measurements in this case are carried out at at least two different, known distances to the object, an interferometer output variable is determined as sample measurement result using the interferometer for each one of the at least two different distances to the object and the orientation in the line atlas is established, in particular the emission wavelength is determined, on the basis of the known distances, the interferometer output variables and the multiplicity of known absorption lines.

In particular, according to the invention, the rangefinder can comprise an absolute distance measurement unit and the at least two different, known distances to the object can be determined by determining the distance by means of the absolute distance measurement unit.

If e.g. a retroreflector is displaced in a tracking manner (the interferometer is always on the target) during the simultaneous measurements by interferometer and absolute distance measurement device, it is possible to estimate the wavelength of the measurement radiation, stabilized to an unknown line, for the interferometer with an accuracy of a few picometers (pm) using the measured distance differences of the two distance measurement devices and the two (known) approximate wavelengths and with knowledge of the atmospheric pressure, humidity and temperature data, as a result of which the employed stabilization line can be identified by using the spectral atlas (line atlas) for the respective absorption medium.

In a specific embodiment of the rangefinder, according to the invention, the rangefinder can be embodied as a laser tracker for continuous tracking of the object embodied as a target and for determining the position of the target. The rangefinder may comprise the laser diode for generating the measurement radiation with a coherence length of at least 10 m, in particular of at least 50 m, a base defining a vertical axis, a beam guiding unit for emitting the measurement radiation and for receiving the measurement radiation reflected at the target, wherein the beam guiding unit can be pivoted in a motor-driven manner relative to the base about the vertical axis and an inclination axis which is substantially orthogonal to the vertical axis, and an angle measurement functionality for determining an alignment of the beam guiding unit relative to the base.

According to the invention, the laser tracker can furthermore comprise a support which can be pivoted in a motor-driven manner about the vertical axis relative to the base and which defines the inclination axis and a targeting unit, which is embodied as a beam guiding unit and can be pivoted in a motor-driven manner about the inclination axis relative to the support, comprising a telescopic unit for emitting the measurement radiation and for receiving at least part of the measurement radiation reflected at the target.

In order to avoid measurement errors caused by an incorrectly assumed wavelength, there can be an unambiguous identification of an absorption line (which is e.g. used for stabilization) every time the system or the laser tracker starts up. In accordance with the calibration according to the invention, this can be achieved by a laser tracker by virtue of using the absolute distance measurement device which is present in addition to the interferometer, with there being active participation by a user by virtue of the user moving the continuously measured target and thereby in each case providing a different distance to the target.

A further aspect of the invention relates to the selection of the absorption medium. The latter can be selected depending on the demanded or desired emission wavelength. In this context, the rangefinder can, according to the invention, comprise an absorption cell comprising the absorption medium, in particular wherein iodine gas forms the absorption medium and the emission wavelength lies between 500 nm and 650 nm, in particular between 630 nm and 635 nm.

Iodine as an absorption medium has a wavelength range, which is attractive for laser trackers in particular, with a multiplicity of absorption lines around 633 nm. As a result, so many absorption lines are defined that an absorption line for stabilization always lies in the vicinity, even in the case of manufacturing-caused scattering of the emission wavelength from the laser diode; however, this line needs to be unambiguously identified every time the light source is started up.

Moreover, in respect of tuning the emission wavelength, the emission wavelength can, according to the invention, be variable in a manner controlled by the control and evaluation unit by modifying a temperature of the laser diode as tuning parameter and/or by modifying an electric current applied to the laser diode as tuning parameter.

In order to control the emission wavelength when starting up the measuring apparatus, the control and evaluation unit can, according to the invention, be embodied in such a way that tuning parameters for the laser diode, provided for setting the emission wavelength are set in such a way when the rangefinder is put into operation that a previous operating state is substantially reproduced by the set tuning parameters, in particular that a last previous operating state is substantially reproduced.

Moreover, the rangefinder comprises, in particular, an interferometer detector for detecting the measurement radiation and for generating the interferometer output variable, based thereon, for the respective distances to the object.

In accordance with a special embodiment of the invention, the laser diode is embodied in such a way that the emission wavelength is variable in a mode hop-free fashion within the wavelength range by varying the at least one tuning parameter.

The invention moreover relates to a calibration method for and with an interferometer of a rangefinder for determining a change in the distance to an object, comprising a tunable laser diode embodied as an interferometer laser beam source for generating measurement radiation in such a way that the measurement radiation is present in longitudinally monomode fashion and an emission wavelength of the measurement radiation is variable within a specific wavelength range by varying at least one tuning parameter, and an absorption medium defining a multiplicity of known absorption lines within the wavelength range. Moreover, provision is made for a memory with a stored line atlas for the absorption medium, which line atlas in each case specifies an absorption strength for respective absorption wavelengths within the wavelength range, and a detector for determining the absorption strength.

Within the scope of the calibration method, defined sample measurements are carried out by varying at least one measurement parameter, sample measurement results are derived from the sample measurements, there is a comparison of the sample measurement results with at least one reference, which is based on the stored line atlas and known for the defined sample measurements, wherein the sample measurement results are compared to at least the reference within the scope of the comparison, and an orientation in the line atlas is established as a function of the comparison and on the basis of an algorithmic evaluation.

A further aspect of the invention relates to a method for determining a change in the distance to an object using an interferometer of a rangefinder for generating an interferometer output variable for the respective distances to the object, comprising a tunable laser diode embodied as an interferometer laser beam source for generating measurement radiation in such a way that the measurement radiation is present in longitudinally monomode fashion and an emission wavelength of the measurement radiation is variable within a specific wavelength range by varying at least one tuning parameter, an absorption medium defining a multiplicity of known absorption lines within the wavelength range, a memory with a stored line atlas for the absorption medium, which line atlas in each case specifies an absorption strength for respective absorption wavelengths within the wavelength range, and a detector for determining the absorption strength.

In the process, a calibration method according to the invention is carried out and, in a distance measurement mode, the emission wavelength is regulated as a function of the absorption strength by means of the at least one tuning parameter in such a way that the emission wavelength remains stable during a specific measurement interval, wherein the emission wavelength of the measurement radiation is determined and/or set as a function of the established orientation in the line atlas. Moreover, the change in the distance to the object is determined in the distance measurement mode by means of the interferometer output variable.

According to the invention, within the scope of the calibration method or the method for determining a change in the distance, the emission wavelength of the measurement radiation can be varied as measurement parameter and, in the process, the absorption strength can be acquired continuously.

In particular, according to the invention, measurement parameter-dependent sample absorption lines can be determined as sample measurement results by the continuous acquisition of the absorption strength and/or the orientation in the line atlas can be brought about as a function of a correspondence of the measurement parameter-dependent sample absorption lines with the known absorption lines, in particular by means of a cross correlation of the measurement parameter-dependent sample absorption lines and the known absorption lines and/or by means of a least squares adjustment.

Alternatively, according to the invention, within the scope of the calibration method or the method for determining a change in the distance, a distance to an object can be varied as a measurement parameter within the scope of the sample measurements, the sample measurements can be carried out at at least two different, known distances to the object, an interferometer output variable can be determined as sample measurement result using the interferometer for each one of the at least two different distances to the object and the orientation in the line atlas, in particular the determining and/or setting of the emission wavelength, can be brought about on the basis of the known distances, the interferometer output variables and the multiplicity of known absorption lines.

In particular, the at least two different, known distances to the object can, according to the invention, be determined in the process by determining the distance by means of an absolute distance measurement unit.

The invention moreover relates to a computer program product, which is stored in a machine readable medium, for controlling the carrying out of sample measurements of a method according to the invention. The computer program product is moreover configured for carrying out the derivation of sample measurement results from the sample measurements, the comparison of the sample measurement results with at least a multiplicity of known absorption lines, the determination of the orientation in the line atlas and the determination and/or setting of the emission wavelength of a method according to the invention, in particular if the computer program product is executed in a control and evaluation unit of a rangefinder according to the invention.

The method according to the invention and the device according to the invention will be described in more detail below in a purely exemplary manner on the basis of concrete exemplary embodiments schematically depicted in the drawings, with further advantages of the invention also being discussed. In detail:

DETAILED DESCRIPTION

Figure 1:
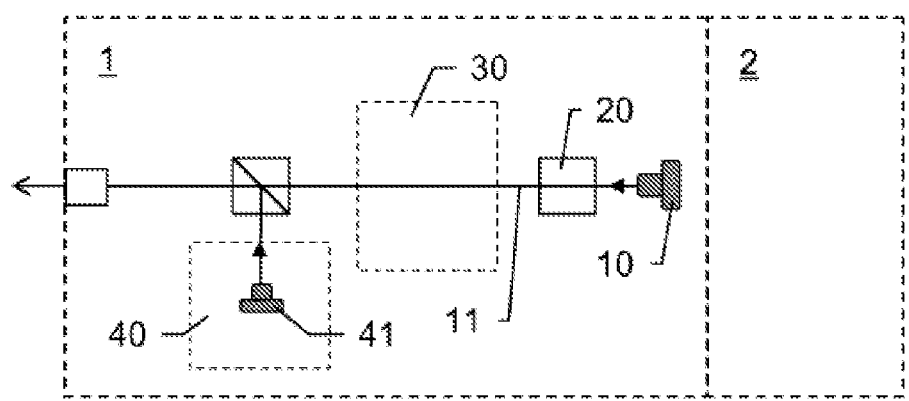
FIG. 1 shows an embodiment of a rangefinder according to the invention, comprising an optical design.

FIG. 1 shows an embodiment of a rangefinder according to the invention, comprising an optical design 1 with a laser diode 10 embodied as an interferometer beam source, an absorption cell 20, an interferometer unit 30 and an absolute distance measurement unit 40, which comprises a further beam source 41, in particular embodied as a laser diode or SLED. The laser diode is used to provide measurement radiation 11 for the interferometer 30 for determining changes in the distance to an object, wherein the absolute distance measurement unit 40 is able to determine absolute distances to objects. What is also shown is a control and evaluation unit 2, at least for controlling the laser diode 10 by means of a temperature and current regulation and for evaluating signals from the absorption cell 20. Furthermore, it can also be used to process the measurement data (e.g. specific distances or interferometer output variables) generated by the interferometer unit 30 and the absolute distance measurement unit 40.

Within the scope of a stabilization mode, the absorption cell 20 is used to realize a stabilization of the measurement radiation to a wavelength standard, i.e., in this case, to an absorption line (e.g. approximately 633 nm) which is defined by an absorption medium (e.g. iodine, $I_2$) in the absorption cell 20. In particular, different stabilization approaches can be used for the stabilization, such as e.g. synchronous detection (modulation of the optical frequency about a central absorption line), a "side-of-line" process or stabilization by means of the Zeeman effect at constant optical frequency (by magnetic modulation).

Within the scope of the synchronous detection (cf. FIG. 2), a continuous change in the wavelength (and hence a change in a distance measured on the basis thereof) is generated, which becomes primarily noticeable in an increased distance noise, wherein the distance noise can, however, be largely eliminated by an increased measurement rate and subsequent integration or a synchronized distance measurement.

The "side-of-line" process (cf. FIG. 3) is based on a stabilization by means of absorption at an absorption value which substantially corresponds to the maximum gradient of a corresponding absorption line of an absorption cell 20 typically embodied as a gas cell (e.g. stabilization at approximately 40% absorption). Since the absorption of a line depends on the gas pressure of the absorption medium (e.g. iodine gas) and hence on the temperature of the absorption cell, the temperature of the absorption cell 20 must be kept very constant in this case.

In general, laser light with a mode hop-free tunable wavelength range is provided by the laser diode 10 for the stabilization, and so there can be tuning to the desired absorption line in terms of wavelength. The laser light generated moreover has a long coherence length, in particular at least 10 m, preferably at least 50 m.

Here, the emission wavelength of the laser diode 10 is tuned by regulating the electric current applied to the diode 10 and/or the temperature of the diode 10 (cf. FIG. 4) by means of the control and evaluation unit 2.

According to the invention, the rangefinder is calibrated in order to set or identify the emission wavelength. To this end, a defined sample measurement is initially carried out. This sample measurement may consist, firstly, of an absorption measurement by means of the absorption cell 20, wherein the emission wavelength of the measurement radiation 11 is varied by the control and evaluation unit 2 in a controlled manner. Here, the emission wavelength can be varied by varying the electric current applied to the diode 10 and/or the temperature of the diode 10. In the process, it is possible to continuously acquire as a measurement result (absorption lines) an absorption behavior (e.g. an absorption strength) as a function of varied current and/or temperature of the diode. On the other hand, the sample measurement can be undertaken when varying a distance to the object, wherein an interferometer output variable is determined in each case as a measurement result by means of the interferometer unit 30 and, furthermore, the distance to the object is measured by means of e.g. the absolute distance measurement unit 40.

An orientation in the line atlas is determined within the scope of the calibration by comparing the respective measurement results—absorption behavior or interferometer output variables—with at least one reference, which is based on a stored line atlas and known for the defined sample measurements, wherein the line atlas in each case specifies an absorption strength for respective absorption wavelengths within the tuning wavelength range. Within the scope of the comparison, the orientation is determined as a function of a comparison of the sample measurement results, at least with the reference. Here, the reference can be embodied by e.g. respective absorption strengths, which are defined by and known from the line atlas, for the absorption wavelengths.

When determining an absorption strength as a function of the wavelength in the case of a varying emission wavelength, the comparison allows a specific region of the line atlas to be identified, which at least largely corresponds to the detected absorption spectrum. Here, the comparison can be brought about by means of a "best fit", a cross correlation or by means of a different type of least squares adjustment. As a result of this carried out identification, an assignment of wavelengths to the detected absorption spectrum is possible. If such a region is identified in the line atlas (i.e. if the orientation is determined), the emission wavelength can be set as a function of a known absorption strength (from the line atlas) by means of open-loop or closed-loop control of the laser diode. Furthermore, the exact wavelength of the emission wavelength can be derived from the additional dependence of the absorption strengths on the wavelength, which is known from the line atlas.

If an interferometer output variable is determined in each case for a plurality of different distances from the object, the orientation in the line atlas can be determined taking into account the distance to the object respectively present in the sample measurement, the determined interferometer output variables and the reference (e.g. known absorption lines spectrum for the employed absorption medium) and the emission wavelength can be determined therefrom.

Figure 2:
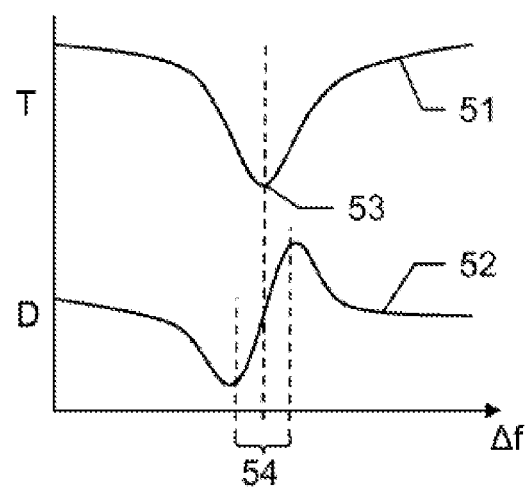
FIG. 2 shows the principle of stabilizing an emission wavelength by means of synchronous detection.

FIG. 2 shows the principle of stabilizing the emission wavelength by means of a synchronous detection. Here, the transmission curve 51 shows the transmission or absorption behavior (transmission=1−absorption) of an absorption medium plotted against a relative frequency $\Delta f$. Analogous thereto, the derivative 52 of the transmission curve 51 is shown, wherein the latter is used for controlling the stabilization. At the absorption maximum 53, which corresponds to a transmission minimum, the gradient equals "0" and quickly increases in respect of magnitude in the case of an increasing deviation from the absorption maximum 53. As a result of this steep flank generated as a result of differentiation 52 in region 54, a change of the absorption relative to the absorption maximum 53 can be detected and identified quickly and accurately by continuously forming the derivative of a continuously measured absorption. Using this information, the laser diode can be controlled by a control loop in such a way that the emission wavelength of the measurement radiation is continuously present within a defined range around the absorption maximum. A respective deviation of the emission wavelength from the absorption maximum 53 can quickly and accurately be determined by means of the derivative 52 and the wavelength can be updated when necessary. By way of example, a lock-in amplifier can be used for this.

Within the scope of synchronous detection, the emission wavelength is continuously modified using a modulation frequency (dither frequency) for the electric current applied to the laser diode such that the emission wavelength "jitters" around the absorption maximum 53 (=line center) and hence a substantial stabilization is achieved. The distance noise generated thereby can be reduced, in particular eliminated, by filtering the measurement signals.

Figure 3:
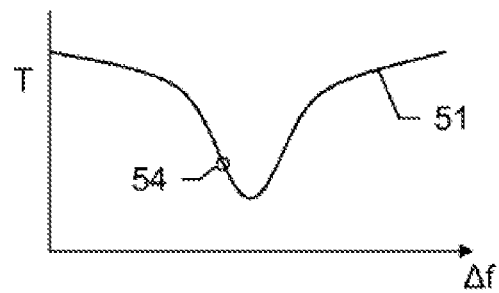
FIG. 3 shows the principle of the "side-of-line" process for stabilizing an emission wavelength.

FIG. 3 shows the principle of the "side-of-line" process for stabilizing the emission wavelength. Here, a work point 54 or a comparatively small work range on one of the flanks of the transmission curve 51 is selected as a stabilization base. As a result of the relatively large gradient in terms of absolute value at the work point 54, a deviation of the absorption from this point 54 can be detected quickly and accurately and the laser diode can be regulated on the basis of this detection by means of a change in current and/or temperature. In order to maintain a constant absorption behavior of the absorption medium, the temperature of the absorption medium or of the absorption cell must be kept substantially constant during this type of stabilization.

Figure 4:
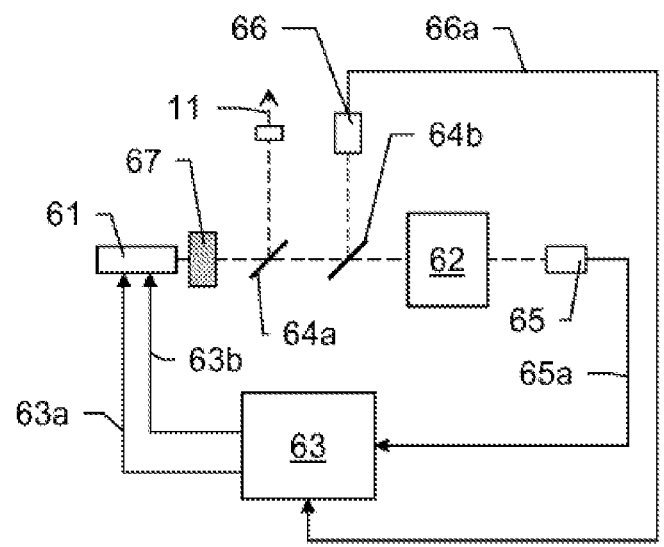
FIG. 4 shows an embodiment of a laser module, which can be regulated, for a rangefinder according to the invention comprising a laser beam source, an absorption cell and a control and evaluation unit.

FIG. 4 shows an embodiment of a laser module, which can be regulated, for a rangefinder according to the invention, comprising a laser beam source 61, an absorption cell 62 and a control and evaluation unit 63. Here, the laser beam source 61 is embodied as a laser diode, e.g. as a distributed feedback (DFB) laser or distributed Bragg reflector (DBR) laser, wherein the emitted measurement radiation is present in a longitudinally monomode fashion and, in particular, has a coherence length of at least 10 m. A first beam splitter 64a is used to split the laser radiation, generated by the beam source 61, for the stabilization into measurement radiation 11 and reference radiation. This reference radiation in turn is split using a second beam splitter 64b, wherein a first component of said reference radiation is transmitted through the gas cell 62 and impinges on a first photodetector 65. Moreover, a second photodetector 66 is provided for detecting a second component of the reference radiation. The signals 65a, 66a which can be generated by the two photodetectors 65, 66 are used for regulating the temperature 63a (via TEC) and the current 63b (I) of the laser diode by means of the control and evaluation unit 63. The measurement radiation 11 can be coupled into an optical fiber for light transport or it can be guided as a free beam. Moreover, provision is made for an insulator 67.

Figure 5:
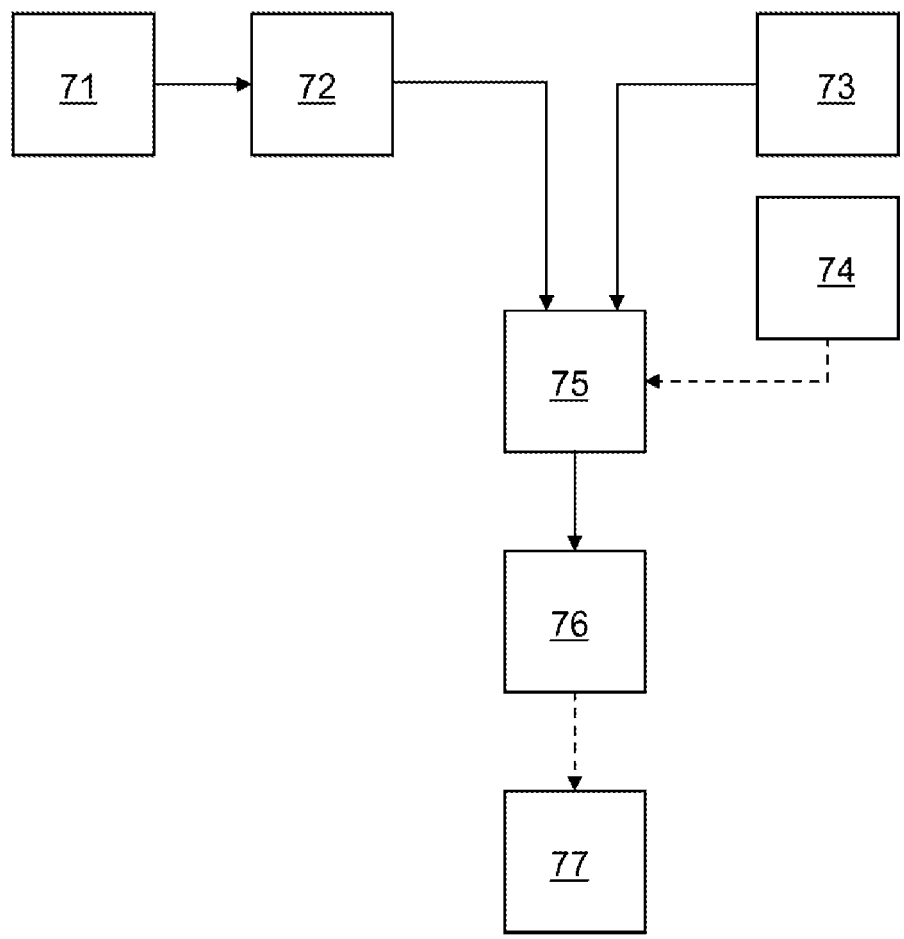
FIG. 5 shows a block diagram for the progress of a calibration according to the invention.

FIG. 5 shows a schematic block diagram for the general progress of a calibration according to the invention. Within the scope of sample measurements 71, sample measurement results 72 are produced by a rangefinder, e.g. a laser tracker. When carrying out the sample measurements 71, at least one measurement parameter (e.g. a distance to a target or the emission wavelength of a laser diode of the measuring apparatus) is varied and the results 72 are generated as a function of the varying measurement parameter. By way of example, these results 72 can be embodied by at least one output variable which is provided by an interferometer of the rangefinder. Furthermore, the results 72 can be embodied by e.g. an absorption spectrum measured by a detector of the rangefinder or by absorption strengths acquired as a function of the emission wavelength.

The determined sample measurement results 72 are compared 75 to at least one reference or to known comparison values. For the purposes of this comparison 75, use as a reference 73 is made of at least one line atlas for a known absorption medium of a gas cell, which is provided for stabilizing the emission wavelength of the laser diode, wherein the line atlas specifies respective absorption strengths or absorption levels for the absorption medium for respective emission wavelengths of the laser diode within a specific wavelength range.

One or more further comparison variables 74 can be taken into account for the comparison 75, depending on the sample measurements 71 carried out and on the type of measurement results 72 generated in the process. If measurements are carried out at different distances from a target within the scope of the sample measurements 71, the distances to the target are used as known further comparison variables 74. By way of example, these distances can be predetermined by specific target positions or can in each case be determined e.g. by an additional rangefinder.

Within the scope of the comparison 75, a comparison is then performed between the sample measurement results 72 and the respectively relevant references 73, 74 and, following this, an orientation 76 in the line atlas is determined, i.e. the best correspondence between the measured absorption values and a region of the line atlas can be identified by comparing at least the known absorption spectrum of the line atlas with the measured absorption strengths, for example by means of a "best fit", and hence a statement can be made about the emission wavelength present during the sample measurements 71.

It is possible on the basis of this determined orientation 76 in the line atlas to set the emission wavelength of the measurement radiation anew in a further step 77 or to determine the exact wavelength of the radiation. In the process, the emission wavelength can be stabilized by continuously measuring an absorption and correspondingly regulating the laser diode (current and/or temperature).

FIGS. 6a-d show a first embodiment of a calibration according to the invention, using a rangefinder comprising a laser diode, absorption cell and detector for measuring the absorption (or transmission) of the measurement radiation in the absorption cell.

Figure 6A:
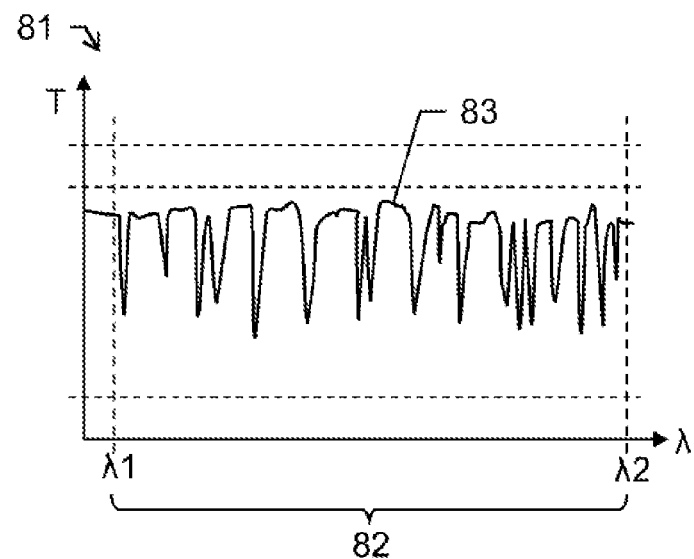
FIGS. 6a-d show a first embodiment of a calibration according to the invention using a rangefinder.

FIG. 6a shows a region of a known transmission spectrum 81 (line atlas) with a transmission behavior T for an absorption medium within a wavelength range 82 between $\lambda 1$ and $\lambda 2$. Here, a transmission curve 83 specifies the transmission or absorption behavior of the absorption medium (e.g. iodine gas) for radiation interacting with the medium, as a function of the wavelength. Such a transmission spectrum may be stored as a line atlas in a memory of a rangefinder according to the invention and may be used as a reference. Alternatively or additionally, an absorption spectrum can be stored for the respective medium, wherein the respective curve profile of an absorption curve (also of the transmission curve) may depend on a curve point resolution.

Figure 6B:
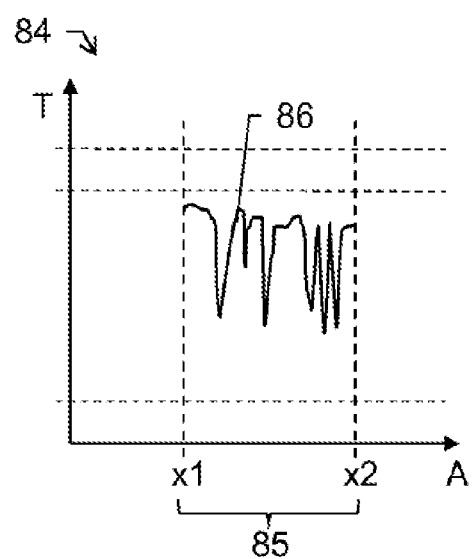

FIG. 6b shows a sample measurement 84, within the scope of which an emission wavelength of the measurement radiation from the laser diode was varied within a range 85 between x1 and x2 by varying tuning parameters A (e.g. current and/or temperature), and the absorption was acquired continuously by a detector in the process. Here, the measured transmission curve 86 shows the measured absorption (=1−transmission) as a function of the tuning parameter A. The range 85 within which the emission wavelength is varied in this case constitutes a portion, in respect of the wavelength, of the wavelength range 82, in which the transmission spectrum 81 is known in accordance with FIG. 6a, i.e. x1 and x2 lie within $\lambda 1$ and $\lambda 2$, wherein, however, initially no wavelength-dependence for the measured transmission curve 86 is provided.

Figure 6C:
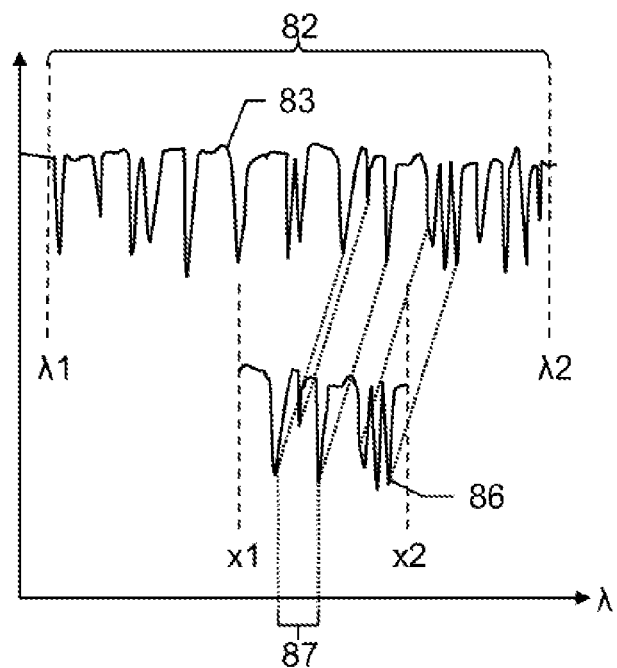

FIG. 6c shows a comparison according to the invention by comparing the known transmission spectrum 81 or the known transmission curve 83 with the measured measured-transmission curve 86. To this end, the transmission curve 83 with the known wavelength range 82 can be used as a basis for the comparison. The measured transmission curve 86 can then be compared to the transmission curve 83 in such a way that the measured spectrum 86 corresponds to the best possible extent to the reference curve 83. By way of example, this can be brought about by means of a cross correlation of known transmission curve 83 and measured transmission curve 86 or by means of a comparison between respective line distances 87 between two specific absorption lines of the transmission curve 83 and measured transmission curve 86.

Figure 6D:
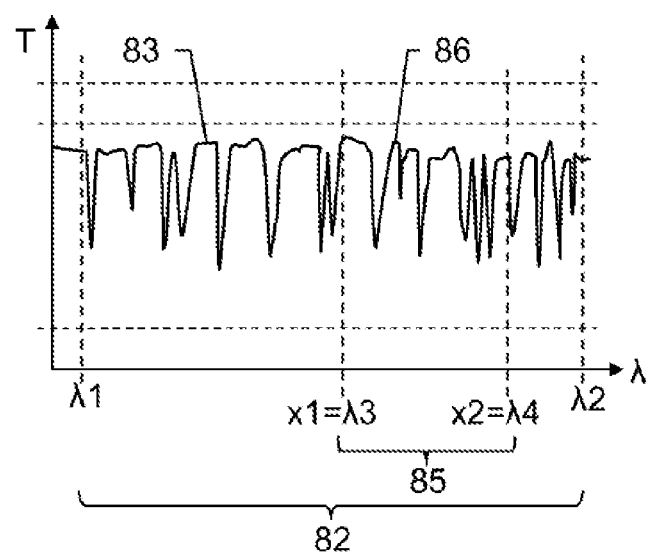

FIG. 6d shows a result of the comparison process depicted in FIG. 6c. Here, the absorption curve 86 acquired within the scope of the sample measurements within the range 85 between x1 and x2 has been matched with the known transmission curve 83 in such a way that the spectra (transmission versus wavelength) largely correspond in the range 85. Therefore, an orientation in the line atlas (known transmission spectrum 81) is known and wavelengths can be assigned to the range 85 (x1=λ3 and x2=λ4). As a result, there can be a unique assignment of the measured wavelengths in the range 85 such that respective wavelengths within the range 85 can in each case be assigned to measured absorption strengths and the emission wavelength of the measurement radiation can be determined exactly. To this end, the emission wavelength can be varied in such a way that, during the variation, times in addition to the acquired absorptions are acquired and, on the basis of absorption acquired over time as a result of this, it is possible to deduce a respective emission wavelength measured at a specific time. As a result, it is possible, for example, to determine a currently present wavelength by means of the currently measured absorption, monitoring of the absorption over time and the preceding comparison. In particular, it is possible in this context to take into consideration both the temperature of the laser diode and the electric current applied to the diode.

Figure 7:
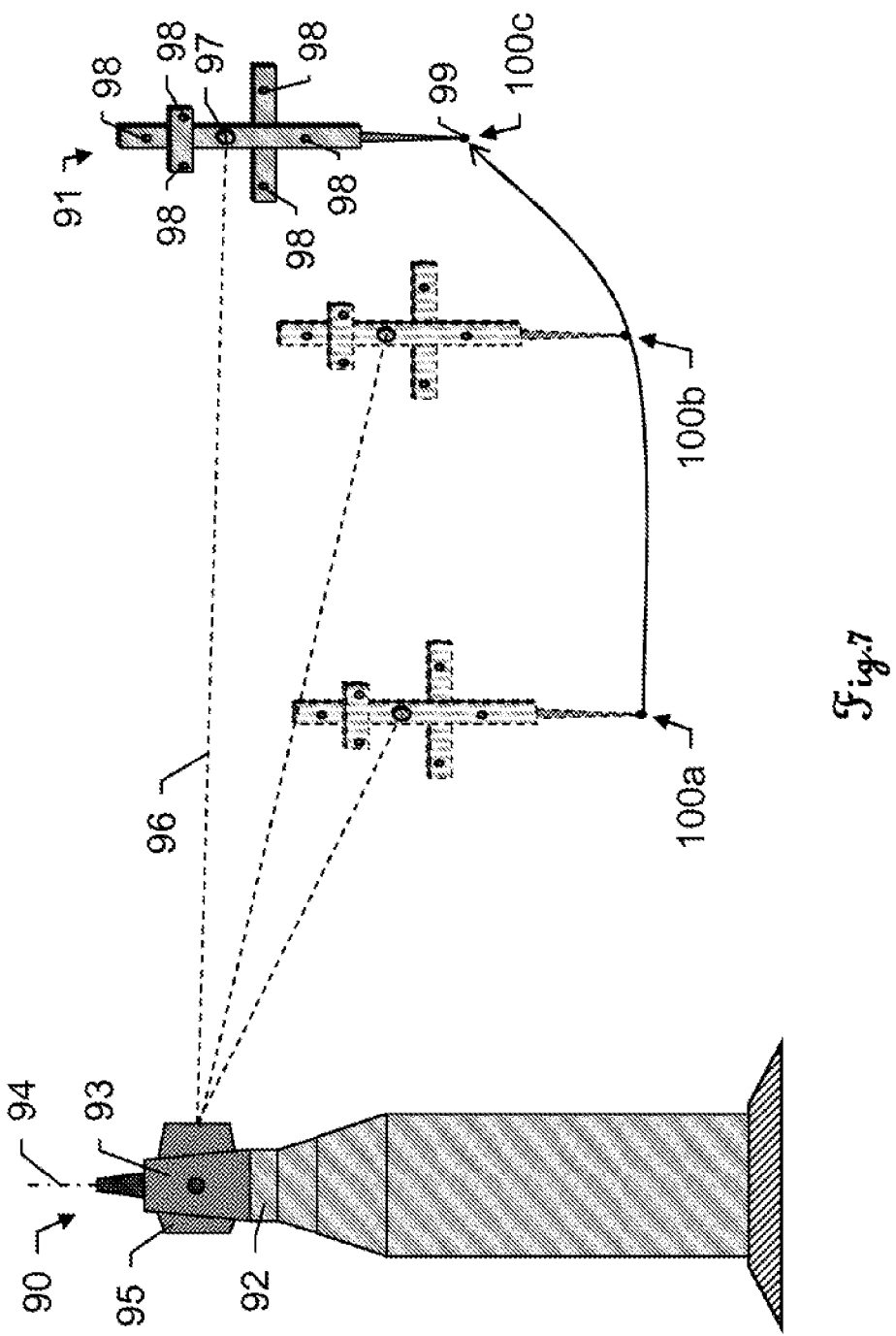
FIG. 7 shows an embodiment for a laser tracker according to the invention with a further embodiment of a calibration according to the invention.

FIG. 7 shows an embodiment for a laser tracker 90 according to the invention, comprising an auxiliary measuring instrument 91 with reflector 97. The laser tracker 90 comprises a base 92 and a support 93, wherein the support 93 is disposed pivotable or rotatable relative to the base 92 about a pivot axis 94 (vertical axis) defined by the base 92. Moreover, a targeting unit 95 is disposed on the support 93 in such a way that the targeting unit 95 can be pivoted relative to the support 93 about an inclination axis (transit axis). As a result of an alignment option of the targeting unit 95 about two axes provided thus, a laser beam 96 emitted by this unit 95 can be flexibly aligned and therefore targets can be targeted. Here, the pivot axis 94 and the inclination axis are disposed substantially orthogonal to one another, i.e. small deviations from an exact axis orthogonality can be predetermined and stored in the system, for example for compensating measurement errors generated thereby.

In the shown arrangement, the laser beam 96 is directed on the reflector 97 and is retro-reflected at the latter back to the laser tracker 90. It is possible to determine a distance to the reflector 97 by means of this measurement laser beam 96, in particular by means of a time-of-flight measurement, by means of the phase measurement principle or by means of the Fizeau principle. To this end, the laser tracker 90 comprises a distance measurement unit (absolute distance measurement unit), for determining this distance between the tracker 90 and the reflector 97, and an angle measurement unit, which makes it possible to determine a position of the targeting unit 95, by means of which the laser beam 96 can be aligned and guided in a defined manner, and hence makes it possible to determine a propagation direction of the laser beam 96. Moreover, the tracker 90 comprises an interferometer unit for determining changes in the distance to a target by means of interferometry.

Moreover, the laser tracker 90, in particular the targeting unit 95, comprises an image acquisition unit for the purposes of determining the position of a sensor exposure on a sensor or a CMOS in an acquired image or is, in particular, embodied as CCD or pixel sensor array camera. Such sensors permit a position-sensitive detection of acquired exposure on the detector. Furthermore, the auxiliary measuring instrument 91 comprises a tactile sensor, the contact point 99 of which can be brought into contact with a target object to be measured. While this contact exists between the sensing tool 91 and the target object, it is possible to exactly determine a position of the contact point 99 in space and hence the coordinates of a point on the target object. This determination takes place using a defined relative positioning of the contact point 99 in relation to the reflector 97 and in relation to markings 98 disposed on the auxiliary measuring instrument 91, which markings can e.g. be embodied as light-emitting diodes. Alternatively, the markings 98 can also be embodied in such a way that these reflect the incident radiation when they are illuminated (auxiliary point markings 98 embodied as retroreflectors), e.g. with radiation having a defined wavelength, in particular exhibiting a specific illumination characteristic, or that these have a defined pattern or color coding. Therefore, an orientation of the sensing tool 91 can be determined from the position or distribution of the markings 98 in an image acquired with the sensor of the image acquisition unit.

In an alternative embodiment (not shown here), a laser tracker according to the invention has a beam guidance unit, separated from the image acquisition unit, for emitting the laser beam, which can likewise be directed onto the reflector 97. Here, both the laser beam and the image acquisition unit can in each case be pivoted about two axes in the motor-driven manner and can, as a result thereof, be aligned in such a way that the target 97 targeted by the laser beam and the markings 98 of the auxiliary measuring instrument 91 can be acquired by means of the image acquisition unit.

In order to align the laser beam 96 on the reflector 97, illumination means for illuminating the reflector 97 with radiation with a specific wavelength, in particular in the infrared wavelength range, are respectively provided on the laser trackers 90 according to the invention and, additionally, at least two cameras with position-sensitive detectors are disposed in each tracker 90. The illumination radiation, which is reflected at the reflector 97 and radiated back to the laser tracker 90, can be detected by means of the cameras and a position of the reflector 97 on the respective detector can be imaged with each one of the position-sensitive detectors. Therefore, it is possible to determine two imaged positions of the reflector by means of the laser tracker 90 and to find the target (reflector 97) as a function of these imaged target positions—e.g. according to well-known principles of photogrammetry—and to align the targeting unit 95 in such a way that the target is targeted by the measurement beam 96.

Moreover, an approximate position of the reflector can be determined on the basis of in each case two images acquired using the laser tracker 90. This position can be determined according to general geometric or trigonometric principles, for example according to geometric construction principles of triangles or by means of the sine and/or cosine laws. Moreover, in order to determine the position roughly, use can be made of well-known processes in photogrammetry (stereophotogrammetry). To this end, moreover, the relative positions and, in particular, alignments of the cameras with respect to one another on the tracker 90 are known.

In this context, the illumination means and the cameras can be disposed in respectively defined positions on e.g. the image acquisition unit, the beam guiding unit, the targeting unit 95, the support 93 or the base 92.

Using knowledge of the positioning of the camera relative to an emission direction of the laser beam 96, the laser beam 96 can be aligned with respect to the established approximate position of the reflector 97 and can be coupled thereto (lock on). As a result, there can be quick alignment of the beam 96, despite a structurally caused offset between the laser emission direction and the acquisition directions of the cameras, and a parallax given by the optical axes of the cameras and the laser beam 96 can be resolved. In particular, the laser beam 96 can be aligned directly on the target 97, i.e. without an iterative intermediate step.

In particular, it is possible—as an alternative or in addition to determining the approximate position of the reflector 97—to determine a rough distance to the reflector 97 from the target positions acquired and imaged on the detectors (on the laser tracker 90). This determination can also be brought about by means of generally valid geometric principles, e.g. by means of the right triangle altitude theorem and/or by means of the sine and/or cosine laws.

Moreover, an alignment according to the invention of the laser beam 96 can also find application in the case of laser trackers without image acquisition unit for determining the orientation (6-DoF camera) of an auxiliary measuring instrument 91 (3D laser tracker).

Furthermore, FIG. 7 shows a procedure for a further calibration according to the invention. To this end, measurement in respect of the auxiliary measuring instrument 91 are carried out with different positions 100a-c of the auxiliary measuring instrument 91. A distance to the tracker 90 is known for each position 100a-c. By way of example, this distance can be determined in each case by means of a measurement using the absolute distance measurement unit, wherein the absolute distance measurement unit comprises a further laser beam source (in addition to the diode for generating the measurement radiation for the interferometer). The measurement radiation generated by the laser diode for the interferometer of the laser tracker 90 is stabilized to an emission wavelength by means of a wavelength stabilization unit (absorption cell) and it is roughly known. The wavelength predetermined thereby can substantially depend on the operating parameters of the laser diode (current and temperature) and on the actuation electronics for the diode. Although there can be stabilization to a fixed wavelength as a result thereof, this wavelength must moreover be known in terms of magnitude for correct and reliable distance measurements (measurements of changes in the distance using the interferometer). The calibration is carried out in order to determine or in order to re-set this wavelength.

To this end, an interferometer output variable is determined using the interferometer of the laser tracker 90 at at least two of the positions 100a-c, in particular continuously at a multiplicity of positions between position 100a and position 100c. Here, the reflector 97 is followed in a tracking manner, i.e. the measurement beam is continuously directed to the reflector 97 during this measurement process. By way of example, this variable may be a number of interferometer pulses (counts), which are given by alternating acquisition of destructive and constructive interference and which can be counted, (e.g. homodyne interferometer) or by a phase difference between a reference signal and a measurement signal (e.g. heterodyne interferometer). Moreover, an absolute distance to the reflector 97 is measured or predetermined in each case. The interferometer output variable thus measured for each position and the respective distance are evaluated by algorithm, taking into account the respectively roughly known wavelengths (for the absolute distance measurement unit and for the interferometer). As a result of this, the wavelength present for the measurement radiation of the laser diode can be estimated very precisely. In particular, atmospheric data, such as e.g. air pressure, humidity and surrounding temperature, are additionally taken into account for this estimate. An orientation in the line atlas is determined on the basis of the estimate of the emission wavelength and with use of a line atlas for the absorption medium of the wavelength stabilization unit. As a result, an absorption line of the absorption medium used for stabilization can be identified and hence the emission wavelength can be determined.

It is understood that these depicted figures only schematically depict possible exemplary embodiments. The various approaches can, according to the invention, likewise be combined with one another and with stabilization and/or interferometry methods, with methods for determining the distance and with generic measuring apparatuses, in particular laser trackers, of the prior art. The aspects according to the invention can also find application in geodetic surveying devices such as e.g. total stations and tachymeters.

What is claimed is:

1. An optical metrology device embodied as a laser tracker configured for continuous tracking of an object, the optical metrology device having a rangefinder for determining a change in distance to the object using an interferometer for generating an interferometer output variable for respective distances to the object, comprising:
    a tunable laser diode for generating a laser beam in such a way that an emission wavelength of the laser beam is variable by varying at least one tuning parameter, wherein initially a dependence of the emission wavelength as function of the at least one tuning parameter is unknown;
    an interferometer detector configured to detect at least part of the laser beam and to generate the interferometer output variable, based thereon;
    an absorption medium for stabilizing the emission wavelength of the tunable laser diode;
    a photodetector for determining a transmission behavior of laser radiation of the tunable laser diode interacting with the absorption medium;
    a memory providing for a specific wavelength range a known absorption spectrum of the absorption medium, the known absorption spectrum specifying respective absorption lines for laser radiation interacting with the absorption medium; and
    a control and evaluation unit configured to carry out a calibration mode for determining a dependence of the emission wavelength of the tunable laser diode as function of the at least one tuning parameter;
    wherein, in the calibration mode:
        the emission wavelength of the laser beam is varied by virtue of varying the at least one tuning parameter such that the emission wavelength of the tunable laser diode crosses at least two absorption lines of the absorption medium, wherein during the process of varying the at least one tuning parameter the absorption strength is continuously acquired and stored by the photodetector, thereby an absorption spectrum of the absorption medium for at least a part of the specific wavelength range that comprises the at least two absorption lines of the absorption medium is measured by the photodetector as a function of the at least one tuning parameter;
        a matching of the measured absorption spectrum as a whole and the known absorption spectrum of the absorption medium is identified in such a way that the measured absorption spectrum as a whole is identified to be a specific wavelength region of the known absorption spectrum; and on the basis of the matching, a wavelength is assigned to the measured absorption spectrum of the absorption medium and the dependence of the emission wavelength as function of the at least one tuning parameter is determined, based thereon.

2. The optical metrology device as claimed in claim 1, wherein the control and evaluation unit is configured to carry out a distance measuring mode, wherein:
an emission wavelength of the laser beam is stabilized using a specific absorption line of the absorption medium so that the emission wavelength remains stable and therefore the change in the distance to the object can be determined by means of the interferometer output variable; and
the specific absorption line is selected by taking into account the determined dependence of the emission wavelength as function of the at least one tuning parameter.

3. The optical metrology device as claimed in claim 2, wherein the device is configured that the calibration mode is carried out when putting the device into operation, controlled automatically by the control and evaluation unit, and the dependence of the emission wavelength as function of the at least one tuning parameter determined in the calibration mode is stored for carrying out the distance measurement mode.

4. The optical metrology device as claimed in claim 1, wherein the matching of the measured absorption spectrum and the known absorption spectrum is determined by cross correlation of the known and measured absorption spectrum and/or by means of a least squares adjustment.

5. The optical metrology device as claimed in claim 1, wherein the matching of the measured absorption spectrum and the known absorption spectrum is determined:
by comparison of line distances between two absorption lines of the known absorption spectrum and line distances between the at least two measured absorption lines; and/or
by taking into account measured absorption strengths of the at least two measured absorption lines.

6. The optical metrology device as claimed in claim 1, wherein, in the calibration mode:
a distance to the object is varied as a measurement parameter;
sample measurements are carried out at at least two different, known distances to the object;
the interferometer output variable is determined as a sample measurement result using the interferometer for each one of the at least two different distances to the object; and
the matching is established on the basis of the known distances, the interferometer output variables and the absorption lines of the known absorption spectrum.

7. The optical metrology device as claimed in claim 6, wherein the rangefinder furthermore comprises an absolute distance measurement unit and the at least two different, known distances to the object are determined by determining the distance by means of the absolute distance measurement unit.

8. The optical metrology device as claimed in claim 1, wherein the control and evaluation unit is embodied in such a way that tuning parameters for the laser diode, provided for setting the emission wavelength, are set in such a way when the rangefinder is put into operation that a previous operating state is substantially reproduced by the set tuning parameters.

9. An optical metrology device embodied as a laser tracker configured for coordinative measurement of an object, wherein
the optical metrology device comprises a base, a support, and a targeting component for emitting a laser beam, wherein the support is disposed rotatable relative to the base about a pivot axis defined by the base, the targeting component is disposed on the support in such a way that the targeting component can be pivoted relative to the support about an inclination axis, and an alignment of the targeting component about the pivot axis and the inclination axis provides alignment of the laser beam onto an object, wherein the optical metrology device is configured to determine a propagation direction of the laser beam,
the optical metrology device is further configured for continuous tracking of the object by means of a tracking beam, for which the optical metrology device comprises a position-sensitive detector for determining a deviation in the impingement point of the tracking beam from a servo control zero point, and
the optical metrology device further has a rangefinder for determining a change in distance to the object using an interferometer for generating an interferometer output variable for respective distances to the object, comprising:
a tunable laser diode for generating the laser beam in such a way that an emission wavelength of the laser beam is variable by varying at least one tuning parameter;
an interferometer detector configured to detect at least part of the laser beam and to generate the interferometer output variable, based thereon;
an absorption medium for stabilizing the emission wavelength of the tunable laser diode;
a photodetector for determining a transmission behavior of laser radiation interacting with the absorption medium;
a memory providing for a specific wavelength range a known absorption spectrum of the absorption medium, the known absorption spectrum specifying respective absorption lines for laser radiation interacting with the absorption medium; and
a control and evaluation unit configured to carry out a calibration mode for determining a dependence of the emission wavelength as function of the at least one tuning parameter;
wherein, in the calibration mode:
an absorption spectrum for at least a part of the specific wavelength range is measured by the photodetector as a function of the at least one tuning parameter, the absorption spectrum comprising at least two absorption lines;
a matching of the measured absorption spectrum and the known absorption spectrum is identified in such a way that the at least two measured absorption lines are assigned to a wavelength region of the known absorption spectrum; and
on the basis of the matching, a wavelength is assigned to the measured absorption spectrum and the dependence of the emission wavelength as function of the at least one tuning parameter is determined, based thereon.

10. The optical metrology device as claimed in claim 9, wherein the control and evaluation unit is configured to carry out a distance measuring mode, wherein:
an emission wavelength of the laser beam is stabilized using a specific absorption line of the absorption medium so that the emission wavelength remains stable and therefore the change in the distance to the object can be determined by means of the interferometer output variable; and the specific absorption line is selected by taking into account the determined dependence of the emission wavelength as function of the at least one tuning parameter.

11. The optical metrology device as claimed in claim 9, wherein the device is configured that the calibration mode is carried out when putting the device into operation, controlled automatically by the control and evaluation unit, and the dependence of the emission wavelength as function of the at least one tuning parameter determined in the calibration mode is stored for carrying out the distance measurement mode.

12. The optical metrology device as claimed in claim 9, wherein the control and evaluation unit is embodied in such a way that tuning parameters for the laser diode, provided for setting the emission wavelength, are set in such a way when the rangefinder is put into operation that a previous operating state is substantially reproduced by the set tuning parameters.

* * * * *